(12) United States Patent
Mittu et al.

(10) Patent No.: US 7,927,155 B2
(45) Date of Patent: Apr. 19, 2011

(54) SECONDARY DISCONNECT FOR CIRCUIT BREAKER DRAWOUT SYSTEM

(75) Inventors: Mahadeva Mittu, Belgaum (IN); Adam Skrudlik, Bielsko-Biala (PL); Tomasz Ignasiak, Bielsko-Biala (PL); Karthikeyan Srinivasan, Madurai (IN); Lars Pommerencke, Neumuenster (DE)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 12/208,449

(22) Filed: Sep. 11, 2008

(65) Prior Publication Data
US 2010/0025202 A1 Feb. 4, 2010

(30) Foreign Application Priority Data

Aug. 1, 2008 (PL) .......................................... 385808

(51) Int. Cl.
*H01R 13/24* (2006.01)
*H02B 11/00* (2006.01)
(52) U.S. Cl. ................... 439/700; 200/50.26; 439/924.1
(58) Field of Classification Search ............... 200/50.26, 200/50.27; 439/700, 924.1
See application file for complete search history.

(56) References Cited

U.S. PATENT DOCUMENTS

| | | | | |
|---|---|---|---|---|
| 1,804,590 A | * | 5/1931 | Brown | 361/607 |
| 2,129,723 A | * | 9/1938 | Wood | 361/607 |
| 2,767,266 A | * | 10/1956 | Hawkins et al. | 200/50.26 |
| 2,794,873 A | * | 6/1957 | Bank | 200/50.26 |
| 2,921,998 A | * | 1/1960 | Pokorny et al. | 200/50.26 |
| 3,197,583 A | * | 7/1965 | Goodwin, Jr. et al. | 200/50.28 |
| 3,440,371 A | * | 4/1969 | Stewart et al. | 200/50.24 |
| 3,469,043 A | * | 9/1969 | Wilson | 200/50.26 |
| 4,012,610 A | * | 3/1977 | Ericson et al. | 200/50.26 |
| 4,121,067 A | | 10/1978 | Rexroad et al. | |
| 4,139,748 A | | 2/1979 | Wolfe et al. | |
| 4,477,701 A | * | 10/1984 | Castonguay et al. | 200/50.27 |
| 4,565,908 A | * | 1/1986 | Bould | 200/50.22 |
| 5,417,595 A | * | 5/1995 | Cullen et al. | 439/700 |
| 5,434,369 A | * | 7/1995 | Tempco et al. | 200/50.26 |
| 5,915,985 A | * | 6/1999 | Fabian et al. | 439/248 |

OTHER PUBLICATIONS

EP09166449, European Search Report and Written Opinion, Sep. 10, 2010.

* cited by examiner

*Primary Examiner* — Neil Abrams
(74) *Attorney, Agent, or Firm* — Cantor Colburn LLP (57) ABSTRACT

A secondary disconnect for a circuit breaker drawout system is provided. The secondary disconnect includes a plurality electrical connectors that are coupled to spacer frames. The spacer frames are movably mounted to guide pins that couple the secondary disconnect to the circuit breaker. A compression spring is disposed about the guide pin and bias's the secondary disconnect. A second spring positioned within the spacer frame applies a biasing force when the circuit breaker is in the racked-in position.

20 Claims, 8 Drawing Sheets

SECONDARY DISCONNECT FOR CIRCUIT BREAKER DRAWOUT SYSTEM

BACKGROUND OF THE INVENTION

The subject matter disclosed herein relates to a secondary disconnect mechanism for a circuit breaker. In particular, the subject matter disclosed herein relates to a secondary disconnect that provides a secondary source of electrical power to accessories in the racked-in and test positions of a circuit breaker drawout system.

Drawout circuit breakers often include a mechanism for moving the breaker in and connecting the breaker to corresponding electrical contacts, a location known as the "racked-in" position. When in the racked-in position, the circuit breaker is coupled to the main electrical circuit and provides the interruption functionality for which it is intended. If the drawout mechanism is reversed to the "racked-out" position, the circuit breaker is disconnected from the electrical contacts and the main electrical circuit. The circuit breaker may be moved to the racked-out position, for example, when maintenance is performed on the main electrical circuit. Typical racking mechanisms often include a third or test position. In the test position the circuit breaker can be closed, opened or tripped in order to check internal and external accessories such as auxiliary switches, shunt trip and under voltage and secondary circuits.

To test the accessories, electrical power is provided to the accessories to enable proper functioning. The electrical power is typically provided from a secondary source, such as a disconnectable mechanism that includes slidable electrical contacts. However, these disconnectable mechanisms typically require a large amount of physical space in which to operate. As smaller circuit breakers, such as molded case circuit breakers for example, are used with drawout mechanisms, it is increasingly difficult to fit the slidable mechanism within the available space.

While existing secondary disconnects for drawout mechanisms are suitable for their intended purposes, there still remains a need for improvements particularly regarding secondary disconnecting mechanisms that provide a reliable and cost effective means for providing electrical power to circuit breaker accessories when in the racked-in and test positions.

SUMMARY OF THE INVENTION

A secondary disconnect mechanism for a circuit breaker drawout is provided having at least one electrical contact movable between a first position and a second position. A first spring is coupled to the at least one electrical contact where the first spring bias' the at least one electrical contact in a first direction. A second spring is coupled to the at least one electrical contract. The second spring bias' the at least on electrical contact when the at least one electrical contact is in the first position.

A secondary disconnect mechanism for a circuit breaker drawout is also provided. The secondary disconnect mechanism includes a first electrical connector, a second electrical connector and a third electrical connector arranged in parallel, wherein the first electrical connector, the second electrical connector and the third electrical connector are movable between a first position and a second position. A base plate is coupled between the first electrical connector, the second electrical connector and the third electrical connector. A first frame is coupled to the base plate and between the first electrical connector and the second electrical connector. A second frame is coupled to the base plate and between the second electrical connector and the third electrical connector. A first spring is arranged to bias the first frame in a first direction. A second spring is arranged to bias the second frame in the first direction. A third spring is coupled to the first frame and arranged to bias the first frame when the first electrical connector, the second electrical connector and the third electrical connector are in the first position. A fourth spring coupled to the second frame and arranged to bias the second frame when the first electrical connector, the second electrical connector and the third electrical connector are in the first position.

A drawout mechanism is also provided having a housing. A mechanism within the housing and movable between a first position, a second position and a third position. Electrical contacts are positioned within the housing and operably coupled to the mechanism. A plug-in base is adjacent to the electrical contacts. A circuit breaker is coupled to the mechanism, wherein the circuit breaker is electrically connected to the electrical contacts in the first position, and disconnected from the electrical contacts when in the second and third positions. A secondary disconnect is coupled to the circuit breaker and electrically coupled to the plug-in base when said the circuit breaker is in the first position and the second position, the secondary disconnect including an electrical connector. A first spring is coupled between the circuit breaker and the electrical connector, the first spring arranged to bias the electrical connector towards the first position. A second spring is provided that is coupled to the electrical connector, the second spring being arranged to bias the electrical connector when the circuit breaker is in the first position.

BRIEF DESCRIPTION OF THE DRAWINGS

Referring now to the drawings, which are meant to be exemplary and not limiting, and wherein like elements are numbered alike.

DETAILED DESCRIPTION

FIGS. 1-4 illustrate a drawout circuit breaker system 20. The drawout circuit breaker 20 is coupled between a main electrical circuit 22 having a protected load 24 and a power source 26 such as an electrical utility network. The drawout circuit breaker 20 includes a housing 28. A door 30 is coupled to the housing 28 by hinges 32. The door 30 includes an opening 34 that allows the operator access to a circuit breaker 36 located within the housing 28. Another opening 38 allows the operator to activate a drawout mechanism 40. The circuit breaker 36 is electrically coupled between the power source 26 and the protected load 24.

It should be appreciated that the circuit breaker 36 is illustrated in the exemplary embodiment having a single connection to the power source 26 and the protected load 24. However, the circuit breaker 36 may comprise of multiple electrical phases or connections. Further, the circuit breaker 36 may be known as a multi-pole circuit breaker having multiple contact arms that connect and disconnected the main electrical circuit 22 from the power source 26. A "multi-pole" circuit breaker the circuit breaker will typically have three or four poles, each carrying a different phase of electricity through the circuit breaker 36. Further, in the exemplary embodiment, the circuit breaker 36 is a molded case circuit breaker (MCCB) where the circuit breaker components are housed within an insulated polymer housing. However, but other types of circuit breakers, such as open frame air circuit breakers may also be used.

The circuit breaker 36 may further include one or more accessories, including but not limited to a shunt trip 46 and an under-voltage accessory 48 for example. The shunt trip 46 is a device mounted within the circuit breaker that allows an operator to remotely switch the circuit breaker from the on to the off position. Typically, the shunt trip 46 is connected to an external switch (not shown). When the switch is closed, an electromagnetic coil inside the shunt trip energizes and applies a force to the circuit breaker handle. An under-voltage accessory used with circuit protective apparatus to interrupt the circuit current when the systems voltage falls below a predetermined value. Similar to the shunt trip 46, the under-voltage accessory 48 acts upon the circuit breaker mechanism causing the circuit breaker to switch from the on to the off positions when the undesired condition occurs.

Figure 1:
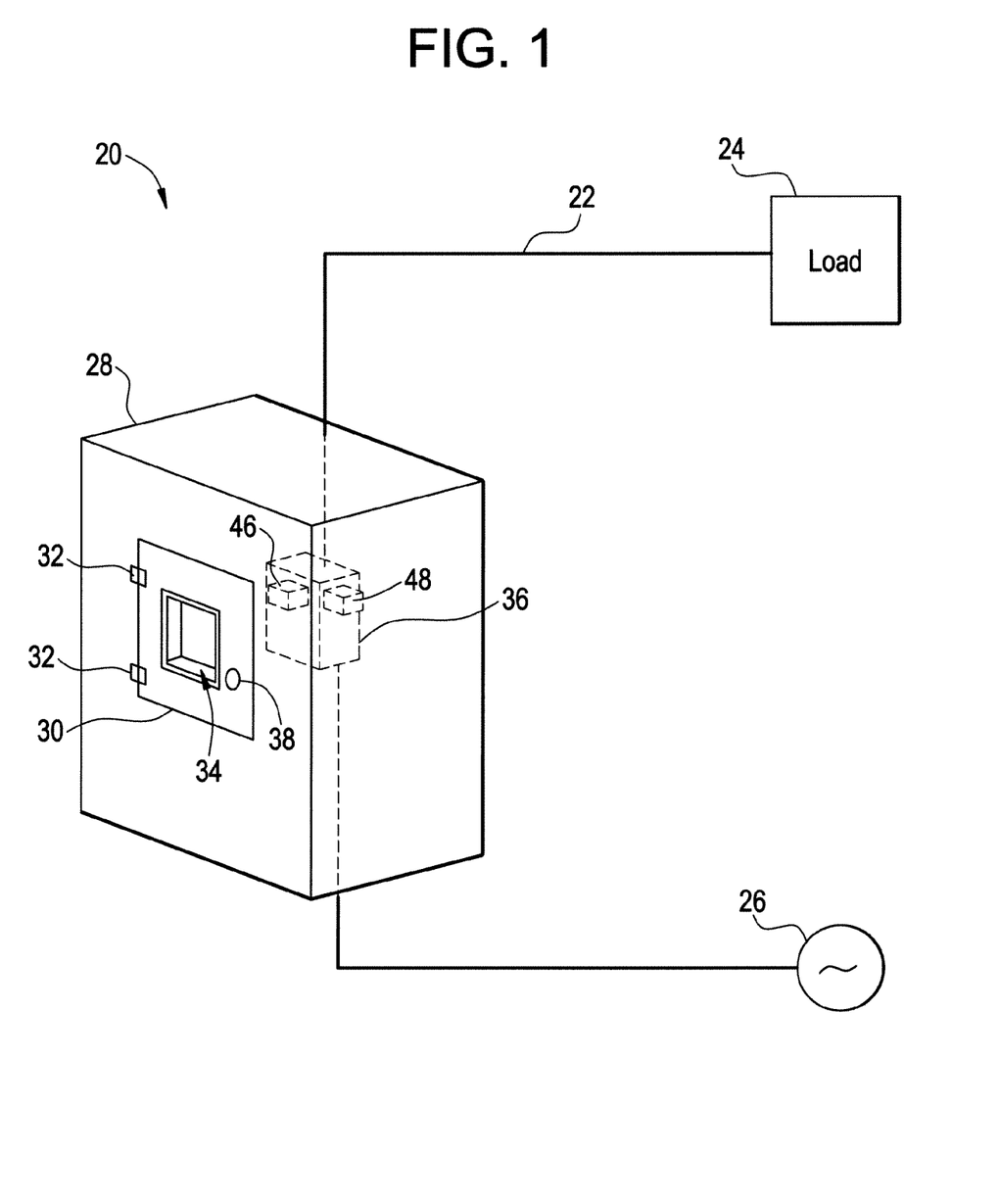
FIG. 1 is a schematic perspective view illustration of a drawout circuit breaker system in accordance with the exemplary embodiment.
Figure 2:
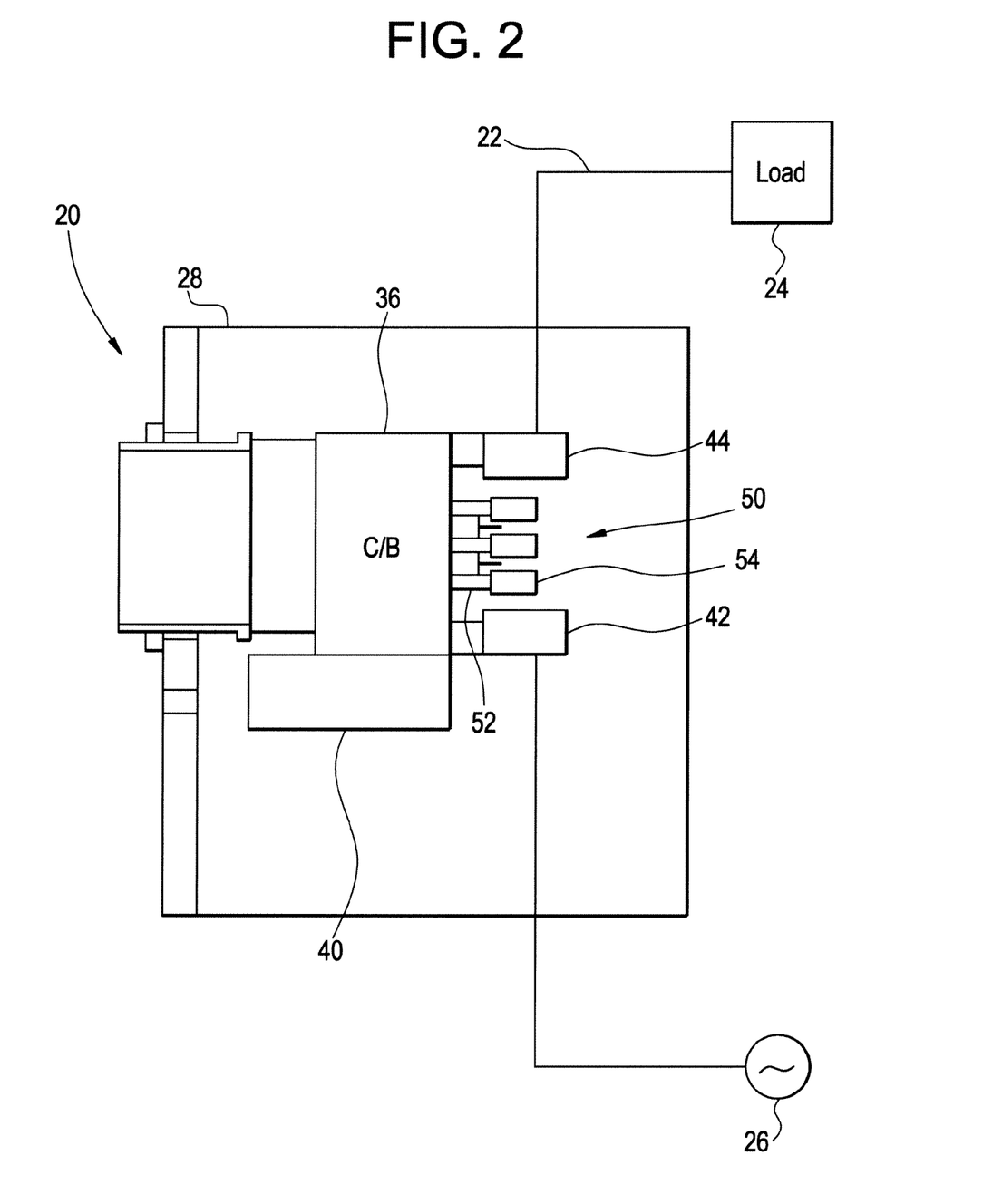
FIG. 2 is a schematic plan side view illustration of the drawout circuit breaker system of FIG. 1 in the racked-in position.
Figure 3:
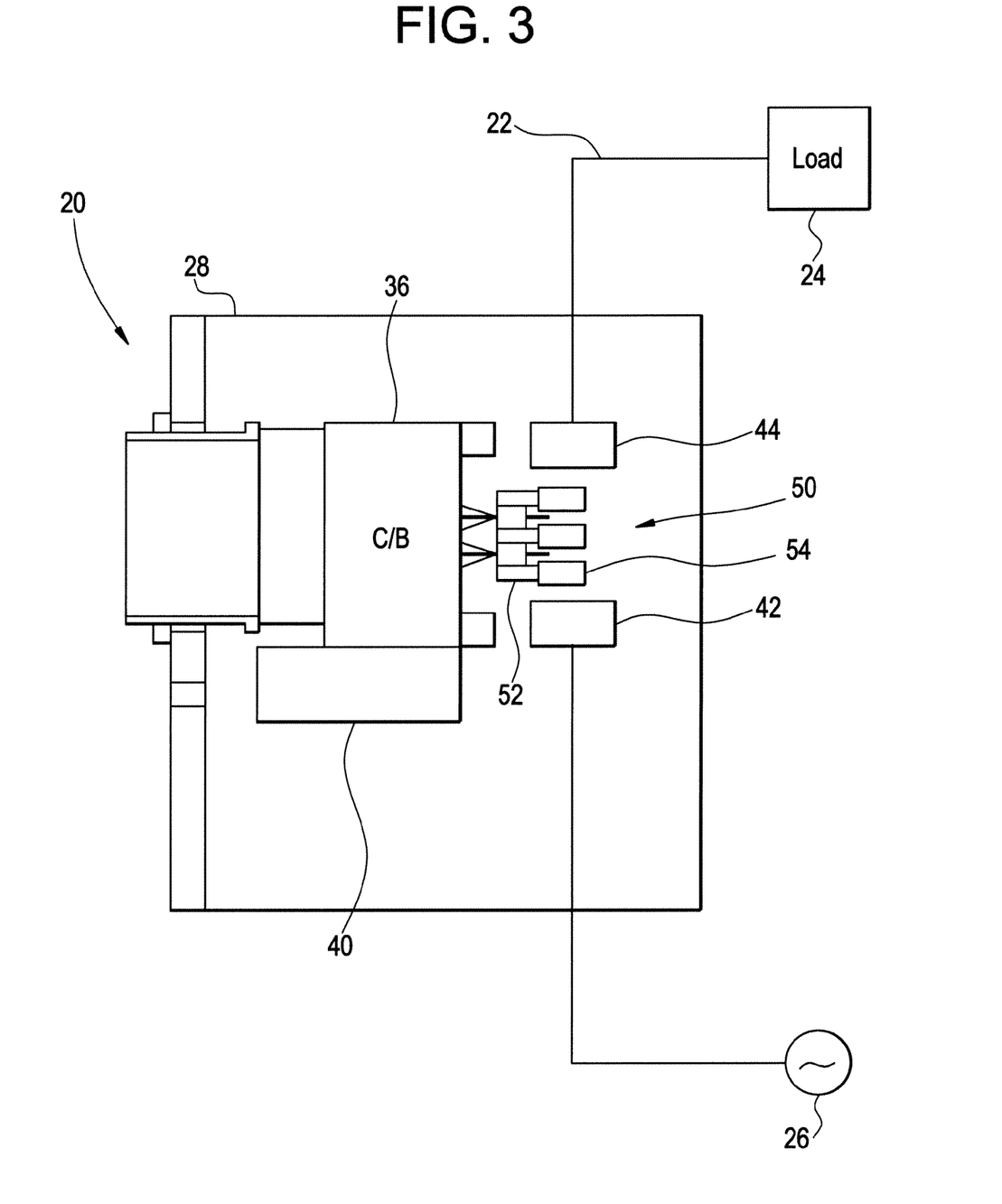
FIG. 3 is a schematic plan side view illustration of the drawout circuit breaker system of FIG. 1 in the test position.
Figure 4:
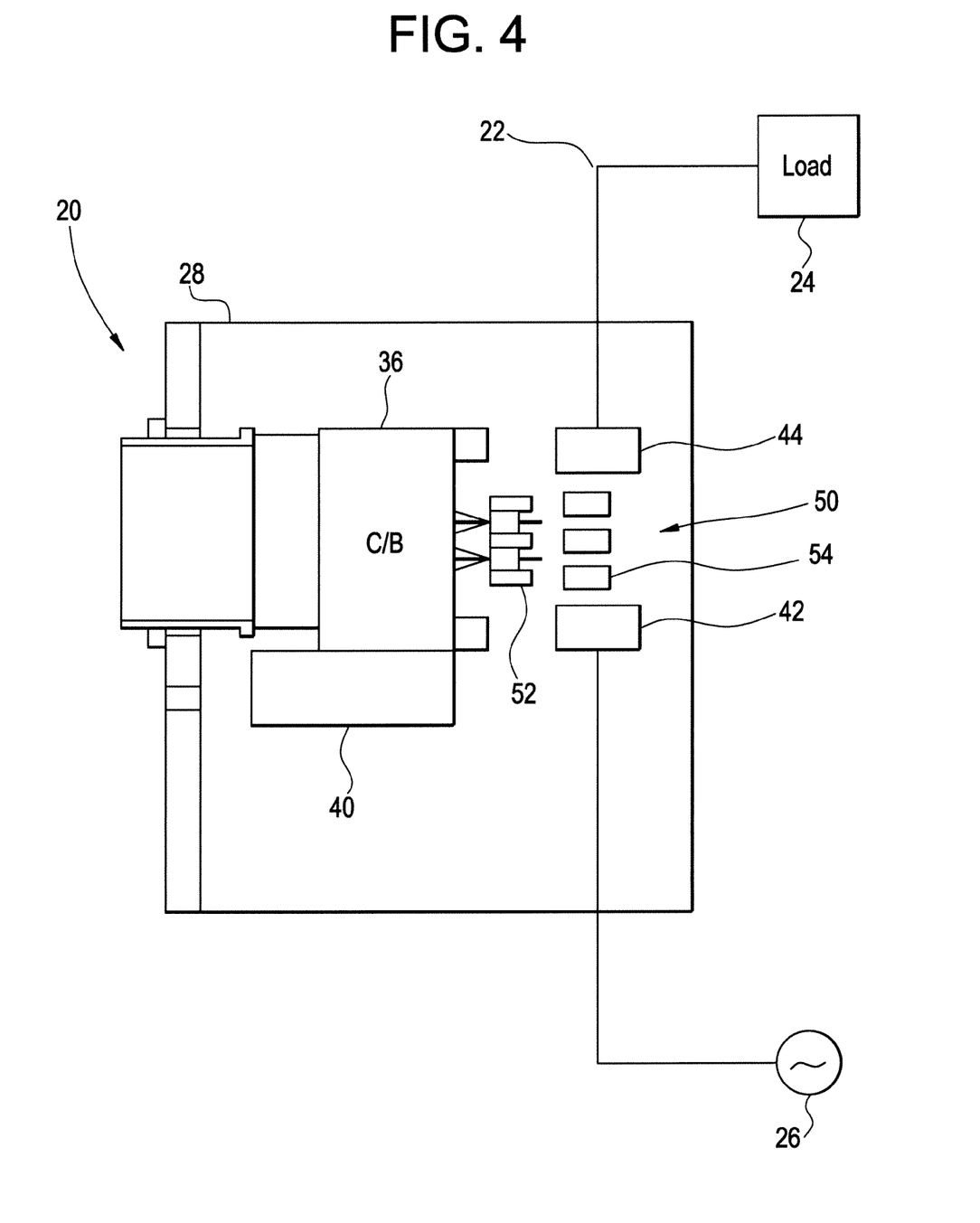
FIG. 4 is a schematic plan side view illustration of the drawout circuit breaker system of FIG. 1 in the withdrawn or racked-out position.

Circuit breaker accessories, such as shut trip 46 and under-voltage accessory 48 for example, require a power source to operate. Further, the power source must be available when the circuit breaker is in certain positions, but disconnected in others. Referring now to FIGS. 2-4, the positions of the drawout system 20 will be described. The drawout system 20 is used to allow an operator to physically connect and remove the circuit breaker 36 into and out of connection with the electrical circuit 22 without having to manually remove the cabling or other electrical connections. An operator may need to disconnect the circuit breaker 36 so that downstream maintenance tasks may be performed for example. To accomplish this, the circuit breaker 36 is mounted to a drawout mechanism 40 as is known in the art. The drawout mechanism 40 includes means for moving the circuit breaker 36 into and out of contact with electrical contacts 42, 44. The inlet contacts 42 connect the circuit breaker 36 to the power source 26 while the outlet contacts 44 provide a connection to the load 24. When the drawout mechanism 40 moves the circuit breaker 36 away from the contacts 42, 44 (FIG. 3, FIG. 4), the electrical connection is broken and no electrical power can flow from the power source 26 to the load 24.

A secondary disconnect 50 is also coupled to the circuit breaker 36. The secondary disconnect 50 includes a movable portion 52 and a stationary portion 54. As will be discussed in more detail below, the movable portion 52 and the stationary portion 54 cooperate to provide electrical power to secondary accessories, such as shunt trip 46 for example, when the circuit breaker 36 is in the racked-in and test positions, but is disconnected when the circuit breaker is in the racked-out position. It should be appreciated that while the stationary portion 54 and the electrical contacts 42, 44 are shown as being discrete components, these components may be integrated into a single assembly known as a plug-in base as is known in the art.

In general, drawout systems have three positions in which the circuit breaker 36 may be positioned. In the racked-in position illustrated in FIG. 2, the circuit breaker 36 is coupled to the contacts 42, 44 and electrical power will flow if the circuit breaker 36 is closed. The contacts 42, 44 may be in the form of a movable terminal connector and a stationary stab, or other such similar structure as is known in the art. At the opposite end of the range of travel is the withdrawn or "racked-out" position illustrated in FIG. 4. In the racked-out position, the circuit breaker is disconnected from the contacts 42, 44 and the secondary disconnect movable portion 52 is disconnected from the stationary portion 54. Further, when in the racked-out position, the drawout system 20 will typically have an interlock arrangement that prevents the circuit breaker 36 from being operated. Finally, as illustrated in FIG. 3, intermediate to the racked-in and racked-out positions is what is commonly referred to as the test position. When in the test position, the circuit breaker 36 is not interlocked and may be operated so that the functions of the circuit breaker may be tested. As will be discussed below, the movable portion 52 and the stationary portion 54 of the secondary disconnect 50 remain electrically coupled when in the test position and allow the secondary accessories, such as shunt trip 46 to be operated in the test position.

Referring now to FIGS. 5-9, the operations of the secondary disconnect 50 will be described. The secondary disconnect movable portion 52 is coupled to the circuit breaker 36 and moves with the circuit breaker as the circuit breaker 36 is moved between the positions described above. The movable portion includes male electrical connectors 56, 58 and 60. The electrical connectors 56, 58 and 60 contain a plurality of male electrical contacts 62. The electrical contacts 62 are connected to wires (not shown) that electrically connect the electrical contacts 62 to secondary accessories, such as shunt trip 46 for example.

Spacer frames 64 are positioned between each of the electrical connectors 56, 58 and 60. A base plate 66 couples the electrical connectors 56, 58, 60 and the spacer frames 64. The electrical connectors 56, 58, 60 and the spacer frames 64 are coupled to the circuit breaker 36 by guide pins 68. In the exemplary embodiment, the guide pins 68 are u-shaped pins that are coupled to the spacer frames 64 to allow the spacer frames 68 to move in the direction of arrow 70. Alternatively, the guide pins 68 may be comprised individual pins rather than a single u-shaped member. An optional intermediate plate 82 may be coupled to the guide pins 68 and used to mount the movable portion 52 to the circuit breaker 36.

Figure 8:
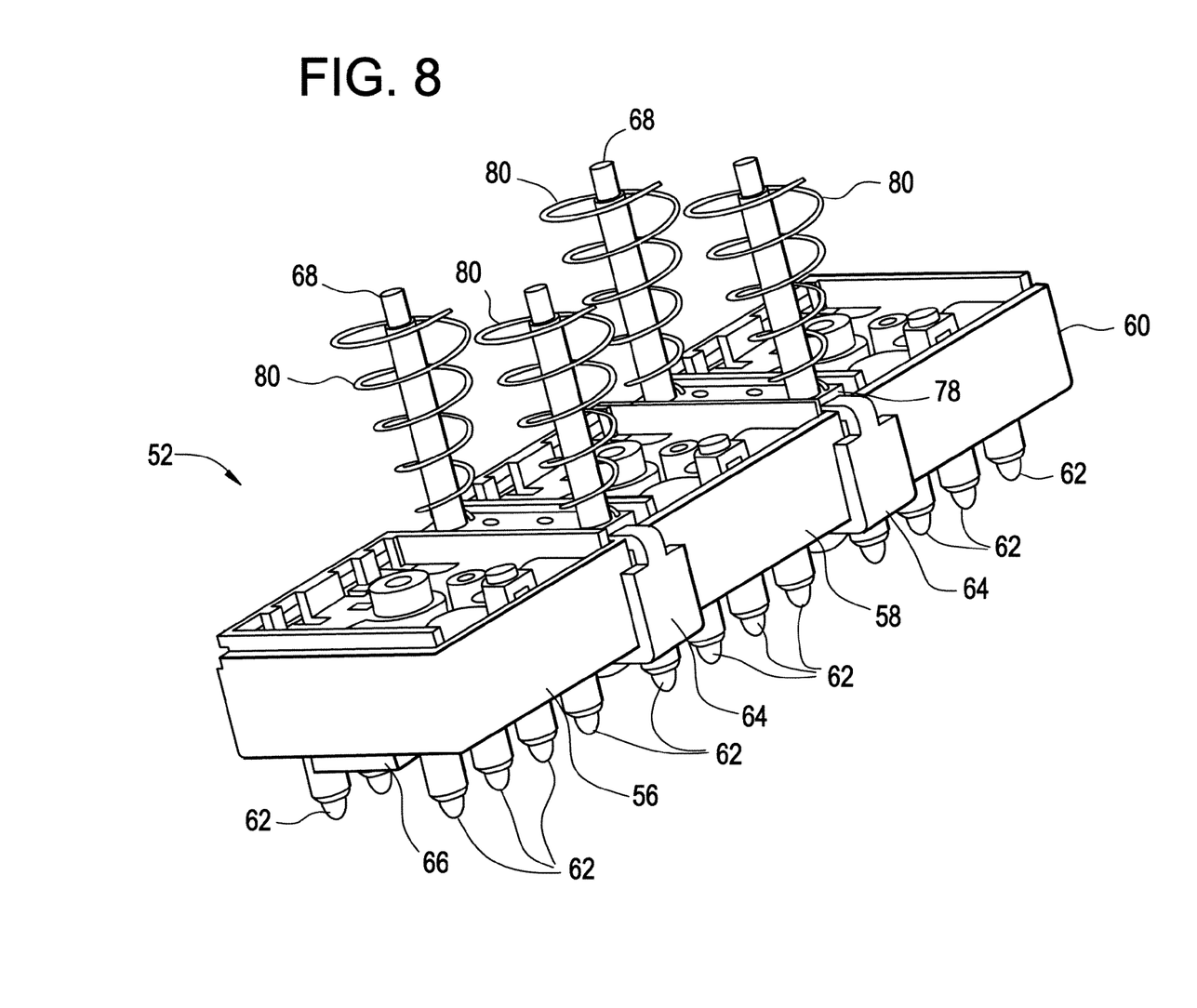
Figure 9:
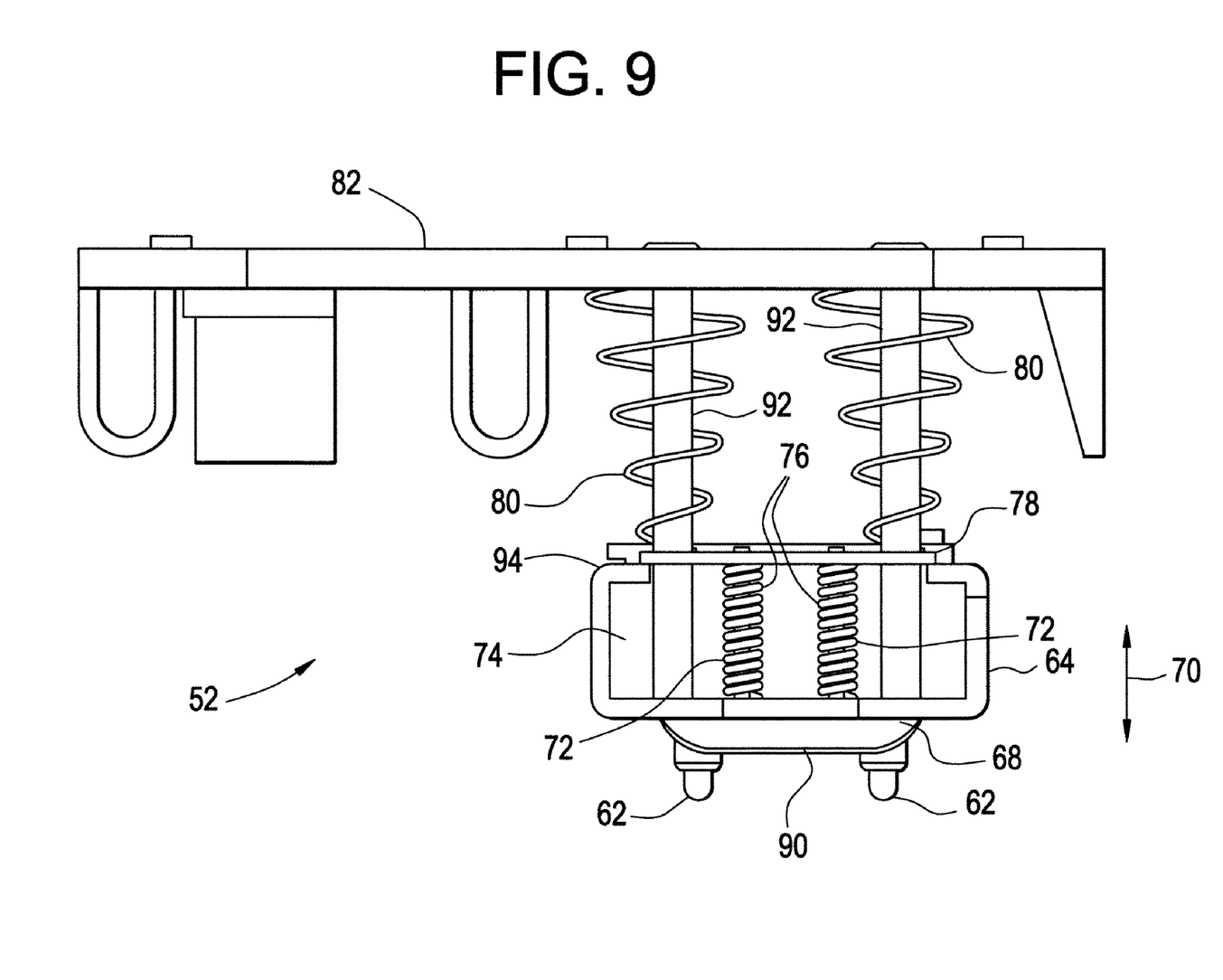

The spacer frames 64 include a pair of compression springs 72 that are arranged within a generally hollow portion 74. The springs 72 are disposed about pins 76 that are coupled between a plate 78 and the spacer frame 64. The plate 78 is also coupled to guide pin 68 to allow the plate to move with the spacer frame 64. As will be discussed below, the compression springs 72 provide a biasing force to create a positive contact when the circuit breaker is in the racked-in position of FIG. 2. In one embodiment, the compression springs 72 are sized to provide a small gap between the plate 78 and the surface 94 of the spacer frame 64.

A compression spring 80 is disposed about the guide pin 68 between the plate 78 and the bottom of the circuit breaker 36. The compression spring 80 biases the spacer frame 64 away from the circuit breaker 36. In the exemplary embodiment, the compression spring 80 is a conical compression spring. The spring 80 is arranged such that the angle of the spring allows the wire diameter for each turn of the spring to telescope or overlap with the adjacent "row" of the spring as the spring 80 is compressed. As will be discussed below, this provides an advantage in that the spring 80 may be fully compressed to a solid height that is equal to one to two thickness of the wire diameter. In the exemplary embodiment, there are four conical compression springs 80. Each of the conical compression springs 80 is disposed about the legs 92 of the guide pins 68

Figure 5:
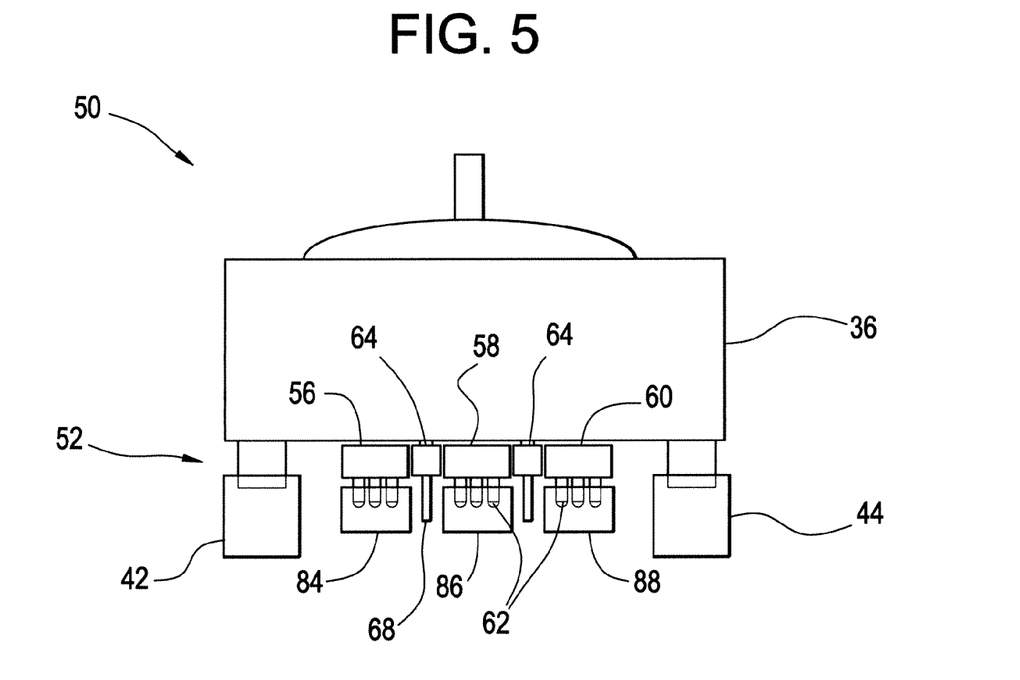
FIG. 5 is a side plan view illustration of the secondary disconnect mechanism of FIG. 2 in the racked-in position.

During operation, the circuit breaker is in the racked-in position (FIG. 5). When in this position, the electrical contacts 62 on the electrical connectors 56, 58 and 60 mate with corresponding female electrical connectors 84, 86, and 88 on the stationary portion 54. When in this position, the compression spring 80 is fully compressed to approximately its solid height. The compression spring 72 is sized to allow compression of the spring 72 once the compression spring 80 has reached its solid height. This allows the spring 72 to maintain a positive force on the electrical connectors 56, 58 and 60 while the circuit breaker 36 is in the racked-in position while also minimizing the space needed to fit the secondary disconnect 50 in the space provided within the housing 28. The combination of the springs 72, 80 also provides other advantages. The interior of the housing 28 often operates at elevated temperatures due to the heat generated by the flow of electrical current. Due to these elevated temperatures along with high stresses, the conical spring may experience thermal aging or creep issues causing the spring 80 to lose force over time. Thus the combination of the springs 72, 80 further compensates for any potential degradation in performance over time.

Figure 6:
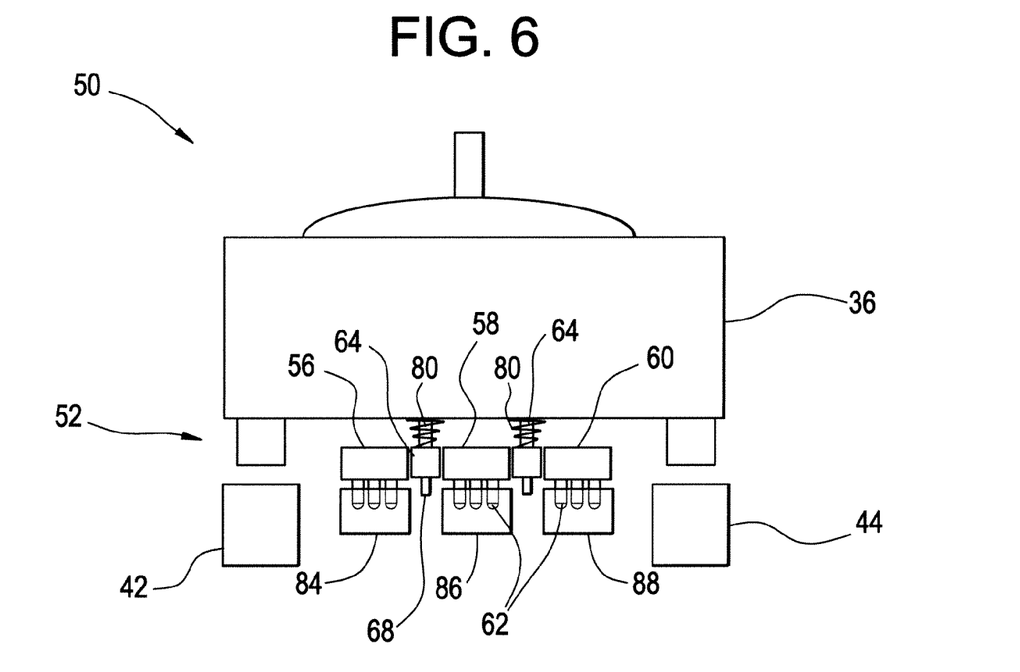
FIG. 6 is a side plan view illustration of the secondary disconnect mechanism of FIG. 3 in the test position.

If the operator desires to disconnect the main electrical circuit 22 and perform testing on the circuit breaker 36 accessories, the drawout mechanism 40 is activated and the circuit breaker 36 is moved to the test position (FIG. 6). In this position, the circuit breaker 36 is disconnected from the inlet contact 42 and the outlet contact 44 and no electrical power flows from the power source 26 to the load 24. However, as the circuit breaker 36 moves, the compression springs 80 expand and applies a force on the spacer frames 64 keeping the male electrical connectors 56, 58 and 60 in contact with the female electrical connectors 84, 86 and 88. The compression spring 80 is sized to maintain an adequate force on the electrical connectors to maintain the electrical connection when the circuit breaker 36 is in the test position.

Figure 7:
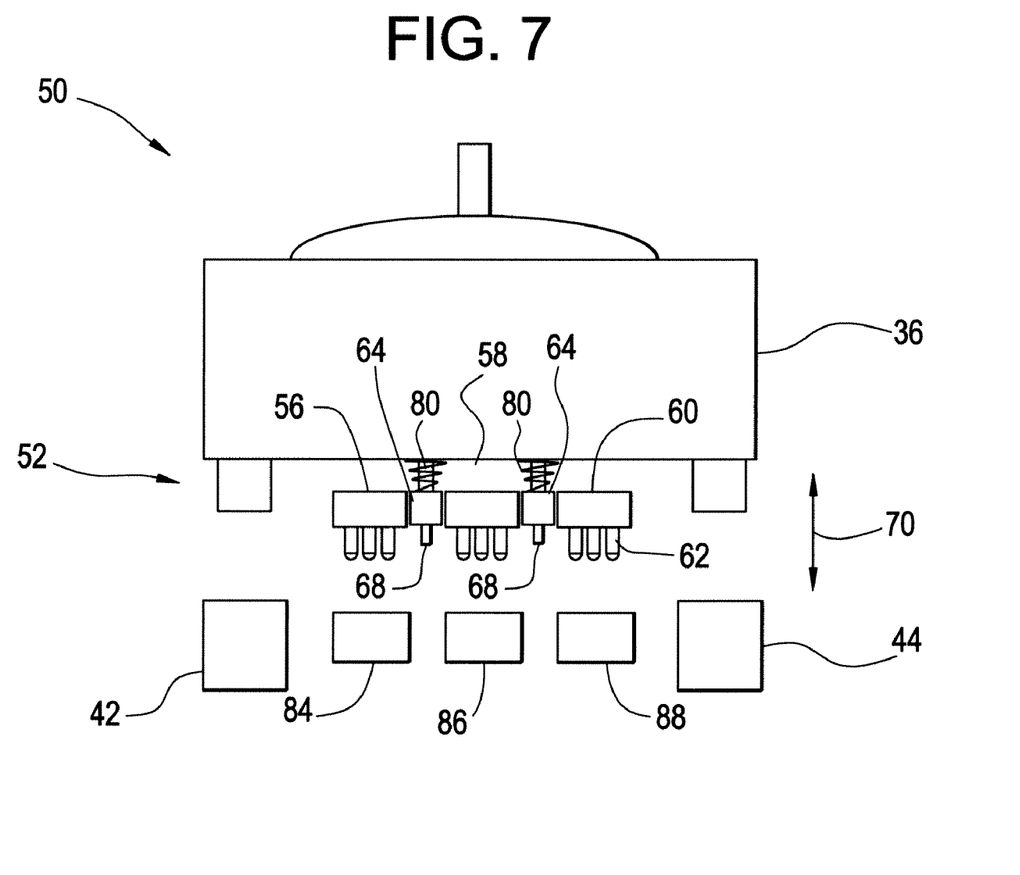
FIG. 7 is a side plan view illustration of the secondary disconnect mechanism of FIG. 4 in the racked-out position; and, FIG. 8 is a partial perspective view illustration of the secondary disconnect mechanism in accordance with the exemplary embodiment; and, FIG. 9 is a partial side plan sectional view illustration of the secondary disconnect mechanism of FIG. 8.

There are times, such as when maintenance is required on the drawout system 20 for example, when it is desirable to completely disconnect all electrical power from the circuit breaker 36 including the secondary accessories. To achieve this, the operator further activates the drawout mechanism 40 and moves the circuit breaker 36 to the racked-out position (FIG. 7). As the circuit breaker continues to move away from the electrical connectors 56, 58 and 60 stay in contact with the connectors 84, 86, and 88 until the space frames 64 contact the bottom portion 90 of the guide pins 68. At this point, the travel of the electrical connectors 56, 58 and 60 relative to the guide pins 68 ends and the female electrical connectors 56, 58 and 60 separate from the female connectors 84, 86 and 88. The gap between the electrical connectors increases until the circuit breaker 36 reaches the racked-out position.

It should be appreciated that the secondary disconnect 50 arrangement provides a number of advantages to service personnel and in the manufacture of the drawout system 20. The secondary disconnect 50 allows the manufacturer to reduce the size and space requirements of the drawout system 20. The secondary disconnect 50 also provides a reliable and positive contact between the movable portions and stationary portions. The secondary disconnect further compensates for harsh environmental conditions that would degrade spring performance over time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A secondary disconnect mechanism for a circuit breaker drawout comprising:
    at least one electrical contact movable between a first position and a second position;
    a first spring coupled to said at least one electrical contact, said first spring biasing said at least one electrical contact in a first direction, said first spring being arranged at a substantially solid height in the first position; and,
    a second spring coupled to said at least one electrical contract, said second spring having a height greater than a solid height in the first position, said second spring biasing said at least one electrical contact with a positive force when said at least one electrical contact is in said first position.

2. The secondary disconnect mechanism of claim 1 wherein said first spring and said second spring are compression springs.

3. The secondary disconnect mechanism of claim 2 wherein said first spring is a conical compression spring.

4. The secondary disconnect mechanism of claim 3 further comprising:
    a frame coupled to said at least one electrical contact and coupled to said second spring; and,
    a guide pin movably coupled to said frame.

5. The secondary disconnect mechanism of claim 4 wherein said second spring is positioned to apply said bias in said first direction.

6. The secondary disconnect mechanism of claim 5 wherein said first spring has a wire diameter and wherein said first spring has a height approximately equal to said first spring wire diameter when said at least one electrical contact is in said first position.

7. A secondary disconnect mechanism for a circuit breaker drawout comprising:
    a first electrical connector, a second electrical connector and a third electrical connector arranged in parallel, wherein said first electrical connector, said second electrical connector and said third electrical connector are movable between a first position and a second position;
    a base plate coupled between said first electrical connector, said second electrical connector and said third electrical connector;
    a first frame coupled to said base plate and between said first electrical connector and said second electrical connector;
    a second frame coupled to said base plate and between said second electrical connector and said third electrical connector;

a first spring is arranged to bias said first frame in a first direction;

a second spring is arranged to bias said second frame in said first direction;

a third spring coupled to said first frame and arranged to bias said first frame when said first electrical connector, said second electrical connector and said third electrical connector are in said first position; and, a fourth spring coupled to said second frame and arranged to bias said second frame when said first electrical connector, said second electrical connector and said third electrical connector are in said first position.

8. The secondary disconnect mechanism of claim 7 further comprising:

a first guide pin coupled to said first frame;

a second guide pin coupled to said second frame.

9. The secondary disconnect mechanism of claim 8 wherein said first spring is disposed about said first guide pin and said second spring is disposed about said second guide pin.

10. The secondary disconnect mechanism of claim 9 wherein said first spring and said second spring are conical compression springs.

11. The secondary disconnect mechanism of claim 10 wherein said first spring and said second spring have a wire diameter, and wherein said first spring and said second spring have a height of approximately equal to said wire diameter when first electrical connector, said second electrical connector and said third electrical connector are in said first position.

12. The secondary disconnect mechanism of claim 11 wherein said first frame and said second frame each have a generally hollow portion and wherein said third spring is positioned within said first frame hollow portion and said fourth spring is positioned within said second frame hollow portion.

13. A drawout mechanism comprising:

a housing;

a mechanism within said housing and movable between a first position, a second position and a third position;

electrical contacts positioned within said housing and operably coupled to said mechanism;

a stationary portion adjacent to said electrical contacts;

a circuit breaker coupled to said mechanism, wherein said circuit breaker is electrically connected to said electrical contacts in said first position, and disconnected from said electrical contacts when in said second and third positions;

a movable portion coupled to said circuit breaker and electrically coupled to said stationary portion when said circuit breaker is in said first position and said second position, said movable portion including:

an electrical connector;

a first spring coupled between said circuit breaker and said electrical connector, said first spring arranged to bias said electrical connector towards said first position, said first spring being at a solid height in the first position; and, a second spring coupled to said electrical connector, said second spring having a height greater than a solid height and being arranged to bias said electrical connector with a positive force when said circuit breaker is in said first position.

14. The drawout mechanism of claim 13 further comprising a guide pin coupled to said circuit breaker, wherein said electrical connector is movably coupled to said guide pin.

15. The drawout mechanism of claim 14 wherein said first spring and said second spring are compression springs.

16. The drawout mechanism of claim 15 wherein said first spring is a conical compression spring.

17. The drawout mechanism of claim 16 further comprising:

a frame movably coupled to said guide pin; and, a base plate coupled between said frame and said electrical connector.

18. The drawout mechanism of claim 17 wherein said second spring is positioned within said frame.

19. The drawout mechanism of claim 18 wherein said first spring has a wire diameter and wherein said first spring has a height approximately equal to said wire diameter when said circuit breaker is in said first position.

20. The drawout mechanism of claim 13 wherein the second spring is disposed between the first spring and the electrical contacts.

* * * * *

UNITED STATES PATENT AND TRADEMARK OFFICE
CERTIFICATE OF CORRECTION

| | | |
|---|---|---|
| PATENT NO. | : 7,927,155 B2 | |
| APPLICATION NO. | : 12/208449 | |
| DATED | : April 19, 2011 | |
| INVENTOR(S) | : Mittu et al. | |

It is certified that error appears in the above-identified patent and that said Letters Patent is hereby corrected as shown below:

On the Cover Page, item (57), under "ABSTRACT", in Column 2, Line 2, delete "plurality" and insert -- plurality of --, therefor.

In Column 1, Line 53, delete "contract." and insert -- contact. --, therefor.

In Column 1, Line 53, delete "on" and insert -- one --, therefor.

In Column 3, Line 38, delete "shut" and insert -- shunt --, therefor.

In Column 6, Lines 28-29, in Claim 1, delete "contract," and insert -- contact, --, therefor.

Signed and Sealed this
Twenty-third Day of August, 2011

David J. Kappos
*Director of the United States Patent and Trademark Office*